US009483062B2

(12) United States Patent
Widgren

(10) Patent No.: US 9,483,062 B2
(45) Date of Patent: Nov. 1, 2016

(54) CLIMATE CONTROL SYSTEM

(71) Applicant: Scypho Sweden AB, Stockholm (SE)

(72) Inventor: Anders Widgren, Täby (SE)

(73) Assignee: ATC Industrial Group AB, Stockholm (SE)

( * ) Notice: Subject to any disclaimer, the term of this patent is extended or adjusted under 35 U.S.C. 154(b) by 372 days.

(21) Appl. No.: 14/348,475

(22) PCT Filed: Nov. 8, 2012

(86) PCT No.: PCT/SE2012/051214
§ 371 (c)(1),
(2) Date: Mar. 28, 2014

(87) PCT Pub. No.: WO2013/070159
PCT Pub. Date: May 16, 2013

(65) Prior Publication Data
US 2014/0229019 A1    Aug. 14, 2014

(30) Foreign Application Priority Data

Nov. 11, 2011 (SE) ...................................... 1100843

(51) Int. Cl.
*G01M 1/38* (2006.01)
*G05B 13/00* (2006.01)
*G05B 15/00* (2006.01)
*G05D 23/00* (2006.01)
*G05D 23/19* (2006.01)
*F24F 11/00* (2006.01)

(52) U.S. Cl.
CPC ........... *G05D 23/19* (2013.01); *F24F 11/0009* (2013.01); *G05D 23/1931* (2013.01)

(58) Field of Classification Search
None
See application file for complete search history.

(56) References Cited

U.S. PATENT DOCUMENTS 6,062,483 A      5/2000 Meletio
2007/0061891 A1* 3/2007 Suzuki ................... H04L 63/20
                                                       726/27
2014/0316581 A1* 10/2014 Fadell .................. F24F 11/0009
                                                       700/276

FOREIGN PATENT DOCUMENTS

GB    2 408 592 A        6/2005
WO    WO 2010/111444 A1  9/2010
WO    WO 2011/062942 A1  5/2011

* cited by examiner

*Primary Examiner* — Diem Cao
(74) *Attorney, Agent, or Firm* — Blank Rome LLP

(57) ABSTRACT

The invention relates to an improved climate control system in which a climate controlling equipment (1) has a control line (2) arranged to be connected to climate influenced impedance means (3). According to the invention, relay means (4) are arranged to disconnect the climate influenced impedance means from the control line under influence from an output (5) of a control unit (6) and to instead connect substituting means (7) providing an impedance controlled by a second output (8) of the control unit. The latter is connected to a processor (9) arranged to receive information from a plurality of climate influenced information means (10, 11, 12) and to process the same in a mathematical model for controlling the impedance of the substituting means via the control unit.

5 Claims, 1 Drawing Sheet

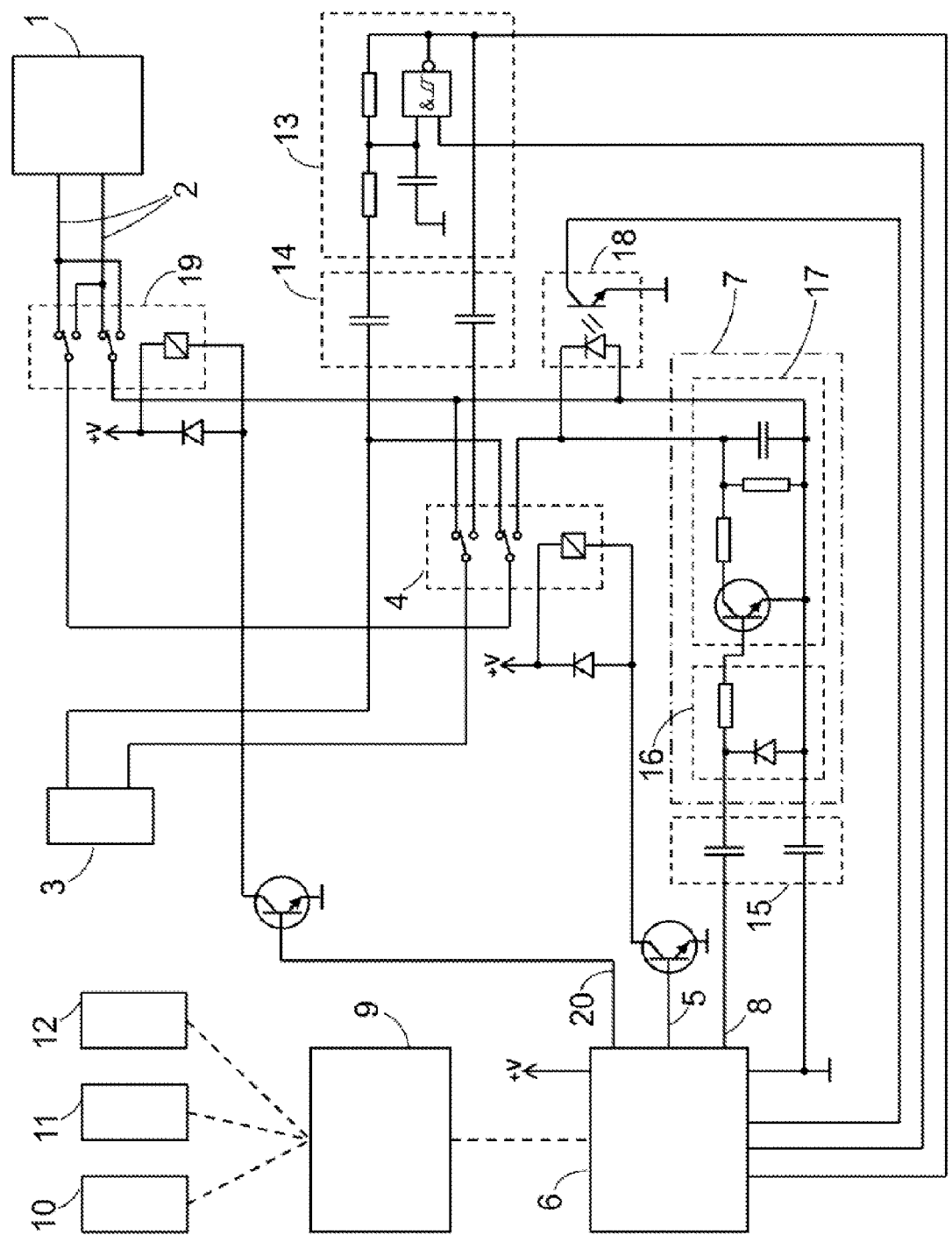

CLIMATE CONTROL SYSTEM

TECHNICAL FIELD

The invention relates to an improved climate control system in which a climate controlling equipment has a control line arranged to be connected to climate influenced impedance means.

BACKGROUND OF THE INVENTION

Climate control systems of the above-described kind exist in many installations and represent a considerable consumption of energy. For users in general and for the global society in particular, less consumption of energy is desirable. While new systems can offer energy savings at a maintained level of climate comfort, only a minor part of installations presently used are likely to be replaced in a near future. Instead of accepting the cost of a new installation, users may choose less comfort so as to reduce the energy consumption. If an adapter would save energy without loss of climate comfort, it could find a huge market.

SUMMARY OF THE INVENTION

According to the invention, relay means are in a climate control system of the above-described kind arranged to disconnect the climate influenced impedance means from the control line under influence from an output of a control unit and to instead connect substituting means providing an impedance controlled by a second output of the control unit. The latter is connected to a processor arranged to receive information from a plurality of climate influenced information means and to process the same in a mathematical model for controlling the impedance of the substituting means via the control unit.

BRIEF DESCRIPTION OF THE DRAWING

The improved climate control system according to the invention will be described with reference made to the drawing (FIG. 1) that shows a block diagram of a preferred embodiment.

PREFERRED EMBODIMENT

The drawing (FIG. 1) shows a block diagram of an improved climate control system in which a climate controlling equipment 1 has a control line 2 arranged to be connected to climate influenced impedance means 3. According to the invention, relay means 4 are arranged to disconnect the climate influenced impedance means 3 from the control line 2 under influence from an output 5 of a control unit 6 and to instead connect substituting means 7 providing an impedance controlled by a second output 8 of the control unit 6. The latter is connected to a processor 9 arranged to receive information from a plurality of climate influenced information means 10, 11 and 12 and to process the same in a mathematical model for controlling the impedance of the substituting means 7 via the control unit 6.

The control unit 6 is provided with suitable measuring means 13 for determining in a disconnected mode of the climate influenced impedance means 3 the characteristics of the same in order to control the impedance of the substituting means 7 at least initially and to frequently verify the same characteristics for a possible return to a connected mode. Suitable galvanic isolation means 14 and 15 are provided for the measuring means 13 of the control unit 6 and for the second output 8 of the same. According to the example, these galvanic isolation means consist of capacitors and the substituting means 7 comprise an AC/DC converter 16 and voltage controlled impedance means 17.

The control unit 6 has polarity probing means 18 connected to the substituting means 7 so as to obtain an indication whether a connection to the sensor line 2 results in a voltage with an appropriate polarity or not. The connection of the substituting means 7 is in dependence on that indication and by means of a two pole two way relay 19 controlled by a third output 20 of the control unit 5 arranged to be maintained or inverted, respectively. The polarity probing means 18 consists of an optocoupler where a light emitting diode is connected to the substituting means 7 in such a way that it acts as a protection diode and provides a signal to the control unit 6 when the polarity is inappropriate.

The man skilled in the art can use the invention as described above in many different embodiments without departing from the scope of the appended claims. For example, the AC/DC converter 16, the voltage controlled impedance means 17 and the capacitors of the galvanic isolation means 15 can be replaced by an optocoupler. The processor 9 can be arranged to use a telecom network for receiving information from climate influenced information means in a plurality of local installations and to process this information in a continuously refined mathematical model for each one of these installations that possibly comprise many buildings with climate controlling equipments for heating and/or cooling.

Known embodiments of the climate influenced impedance means 3 are thermostats with thermistors and capacitive sensors indicating relative humidity. While such embodiments are useful also for the climate influenced information means 10, 11 and 12, it is possible to add suitable embodiments of these for communicating user responses, preferably reduced into just "Ok" to accept an energy saving climate comfort level, or "Not Ok" to get more comfort by accepting then the cost of less energy saving. User friendly embodiments of application specific devices can here be complemented by application software solutions for commonly used smart mobile devices.

The invention claimed is:

1. A climate control system in which a climate controlling equipment has a control line arranged to be connected to climate influenced impedance means, wherein relay means are arranged to disconnect the climate influenced impedance means from the control line in accordance with an output of a control unit and to instead connect, to the control line, substituting means providing an impedance controlled by a second output of the control unit, the control unit being connected to a processor arranged to receive climate information from a plurality of climate influenced information means and to process the climate information from the plurality of climate influenced information means in a mathematical model for controlling the impedance of the substituting means via the control unit.

2. A climate control system according to claim 1, wherein the control unit is provided with measuring means for determining, in a disconnected mode of the climate influenced impedance means, the characteristics of the climate influenced impedance means, in order to control the impedance of the substituting means at least initially and to frequently verify the characteristics of the climate influenced impedance means for a possible return to a connected mode.

3. A climate control system according to claim 2, wherein suitable galvanic isolation means are provided for the measuring means of the control unit and for the second output of the control unit.

4. A climate control system according to claim 3, wherein the galvanic isolation means consist of capacitors and the substituting means comprise AC/DC converter means and voltage controlled impedance means.

5. A climate control system according to claim 1, wherein the control unit has polarity probing means connected to the substituting means so as to obtain an indication of whether a connection to the sensor line results in a voltage with an appropriate polarity or not, the connection of the substituting means corresponding to the polarity indication and by means of a two pole two way relay controlled by a third output of the control unit arranged to be maintained or inverted, respectively.

\* \* \* \* \*